United States Patent
Ryf et al.

(10) Patent No.: US 8,152,434 B2
(45) Date of Patent: Apr. 10, 2012

(54) DOUBLE INFEED STACKING TABLE WITH CENTERING AND METHOD FOR TRANSFERRING STACKS TO A GRIPPER WITH AN INFEED STATION OF THIS TYPE

(75) Inventors: Marc Ryf, Aarau (CH); Stefan Liebheit, Staufen (CH)

(73) Assignee: Müller Martini Holding AG, Hergiswil (CH)

( * ) Notice: Subject to any disclaimer, the term of this patent is extended or adjusted under 35 U.S.C. 154(b) by 333 days.

(21) Appl. No.: 12/380,988

(22) Filed: Mar. 4, 2009

(65) Prior Publication Data

US 2009/0238672 A1 Sep. 24, 2009

(51) Int. Cl.
B65H 31/30 (2006.01)
B65F 9/00 (2006.01)
B66C 1/42 (2006.01)
B66F 9/14 (2006.01)

(52) U.S. Cl. ............... 414/789.9; 414/788.9; 414/790.2; 414/907

(58) Field of Classification Search ............... 198/345.1, 198/364, 370.02, 416, 429, 468.01, 468.9, 198/738, 747; 271/221, 223; 414/789, 789.1, 414/789.6, 789.9, 790, 790.2, 790.4, 790.6–790.8, 414/791.8, 799, 907, 931
See application file for complete search history.

(56) References Cited

U.S. PATENT DOCUMENTS

| | | | | |
|---|---|---|---|---|
| RE22,395 E | * | 11/1943 | Bleistein | 271/198 |
| 3,662,901 A | * | 5/1972 | Brintley, Sr. | 414/789.1 |
| 3,667,751 A | * | 6/1972 | Zernov et al. | 271/248 |
| 3,713,651 A | * | 1/1973 | Abler et al. | 271/221 |
| 3,977,671 A | * | 8/1976 | Taylor et al. | 271/221 |
| 4,050,591 A | * | 9/1977 | Dunlap | 414/790 |
| 5,944,477 A | * | 8/1999 | Shill | 414/788 |
| 7,290,484 B1 | * | 11/2007 | Kirar et al. | 100/7 |
| 2007/0154292 A1 | * | 7/2007 | Gammerler et al. | 414/286 |
| 2007/0248446 A1 | | 10/2007 | Wildner et al. | |
| 2009/0263229 A1 | * | 10/2009 | Liebheit | 414/802 |

FOREIGN PATENT DOCUMENTS

| EP | 0 310 998 | 4/1989 |
|---|---|---|
| EP | 1 801 047 | 6/2007 |

* cited by examiner

*Primary Examiner* — Gregory Adams (74) *Attorney, Agent, or Firm* — Lucas & Mercanti, LLP; Klaus P. Stoffel (57) ABSTRACT

An infeed station has a stack feeder and a first and second chamber, which can each receive stacks from the stack feeder. The stacks can be conveyed in the chambers and can be transferred to a stack gripper with the conveyors assigned to the first chamber and the second chamber. First centering units serve to center the stacks in the first chamber, and second centering units serve to center the stacks in the second chamber. Third conveyors are arranged between the first and second conveyors. The first and second centering units can be shifted relative to each other so that the third conveyors are positioned in the first or second chamber, and the chamber with the third conveyors is much wider than the other chamber. The infeed station can be changed between double infeed with parallel processing of two stacks and single infeed with processing of only one stack of relatively great width at a time.

10 Claims, 10 Drawing Sheets

DOUBLE INFEED STACKING TABLE WITH CENTERING AND METHOD FOR TRANSFERRING STACKS TO A GRIPPER WITH AN INFEED STATION OF THIS TYPE

BACKGROUND OF THE INVENTION

1. Field of the Invention

The present invention relates to an infeed station of a stack palletizing system, with a stack feeder, a first and second chamber, which can each receive stacks from the stack feeder, first conveying means assigned to the first chamber and second conveying means assigned to the second chamber, with which stacks are conveyed in the chambers and can be transferred to a stack gripper, and first centering means for centering the stacks in the first chamber and second centering means for centering the stacks in the second chamber.

2. Description of the Related Art

A prior-art infeed station of this type is disclosed by EP 1 801 047 A. In the cited document, the station is referred to as a transfer unit and has a displacement unit, on which a carriage is mounted in such a way that it can be displaced horizontally and transversely to the direction of conveyance. Two placement means are provided. They are arranged side by side and support one stack each. In the present case, these placement means are conveyor belts. Two stacks located on the two placement means of the infeed station (or transfer unit, as it is referred to in the cited document) are seized with a stack gripper and set down on a pallet. To process stacks that are relatively wide, the infeed station must be constructed correspondingly wide, but this is a disadvantage with respect to the amount of space that it requires and with respect to the manufacturing costs. Adaptation to different formats is thus possible only with a comparatively wide infeed station.

SUMMARY OF THE INVENTION

The object of the invention is to create an infeed station of the type described above, with which stacks of greatly varying width can be transferred to a stack gripper but which nevertheless can be constructed relatively narrow.

In accordance with the invention this problem is solved by the fact that third conveying means are arranged between the first and second conveying means and that the first and second centering means can be shifted relative to each other in such a way that the third conveying means are positioned in the first or second chamber, and the chamber with the third conveying means is much wider than the other chamber.

The infeed station of the invention provides the option of double infeed or single infeed of stacks. In the case of double infeed, two relatively narrow stacks are received parallel to each other and successively in time and are simultaneously transferred to the gripper. In the case of single infeed, only one relatively wide stack at a time is received and transferred to the gripper. Accordingly, the gripper then palletizes only this relatively wide stack. In the case of single infeed, the stacks are conveyed by the first or the second conveying means and the third conveying means. In the case of double infeed, the conveyance in the first chamber is preferably carried out with the first conveying means and in the second chamber with the second conveying means. The third conveying means is preferably not active here. The infeed station thus allows the processing of relatively narrow stacks as well as much wider stacks and thus has the advantage that it is highly versatile with respect to the stack formats it can handle.

In a further development of the invention, the first and second centering means have two centering members each, which are spaced some distance apart and are supported at an upper end or at a lower end in such a way that they can be shifted transversely to the direction of conveyance of the conveying means. By shifting these centering members, which are preferably designed as centering plates, chambers of highly variable width can be formed. In particular, an asymmetrical arrangement is possible. For double infeed, the two chambers can be adjusted, for example, by shifting the centering members, to a width on the order of, for example, 100-300 mm. For single infeed, a chamber with a width of, for example, 100-500 mm is possible. Preferably, the centering members or centering plates are shifted by a motor, for example, by means of a spindle.

In a further development of the invention, the two chambers and the conveying means and centering means are installed on a table that can be moved transversely to the direction of conveyance, so that the stacks are fed to the first and second chamber by the stack feeder. In the case of double infeed, for example, a first stack is thus fed to the first chamber, and then the table is moved, so that a second stack can be fed to the second chamber. In the case of single infeed, the table is moved in such a way that the correspondingly wide stack is fed to the chamber provided for it.

In a further development of the invention, the centering means can be adjusted independently of one another. This allows a very fast and simple changeover between single infeed and double infeed without the use of tools. The centering means preferably are each supported at an upper end in such a way that they can be displaced on horizontal guide rods.

In a further development of the invention, the conveying means each have rollers. The stacks can be conveyed and centered especially easily and reliably on these rollers. In this connection, it is preferably provided that each of the centering means has a contour at its lower end that is designed to correspond to the contour of the rollers. The centering means thus mesh with the spaces between the rollers and allow especially reliable centering of the stacks.

The invention also concerns a method for transferring stacks to a stack gripper with an infeed station.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DETAILED DESCRIPTION OF THE INVENTION

Figure 1:
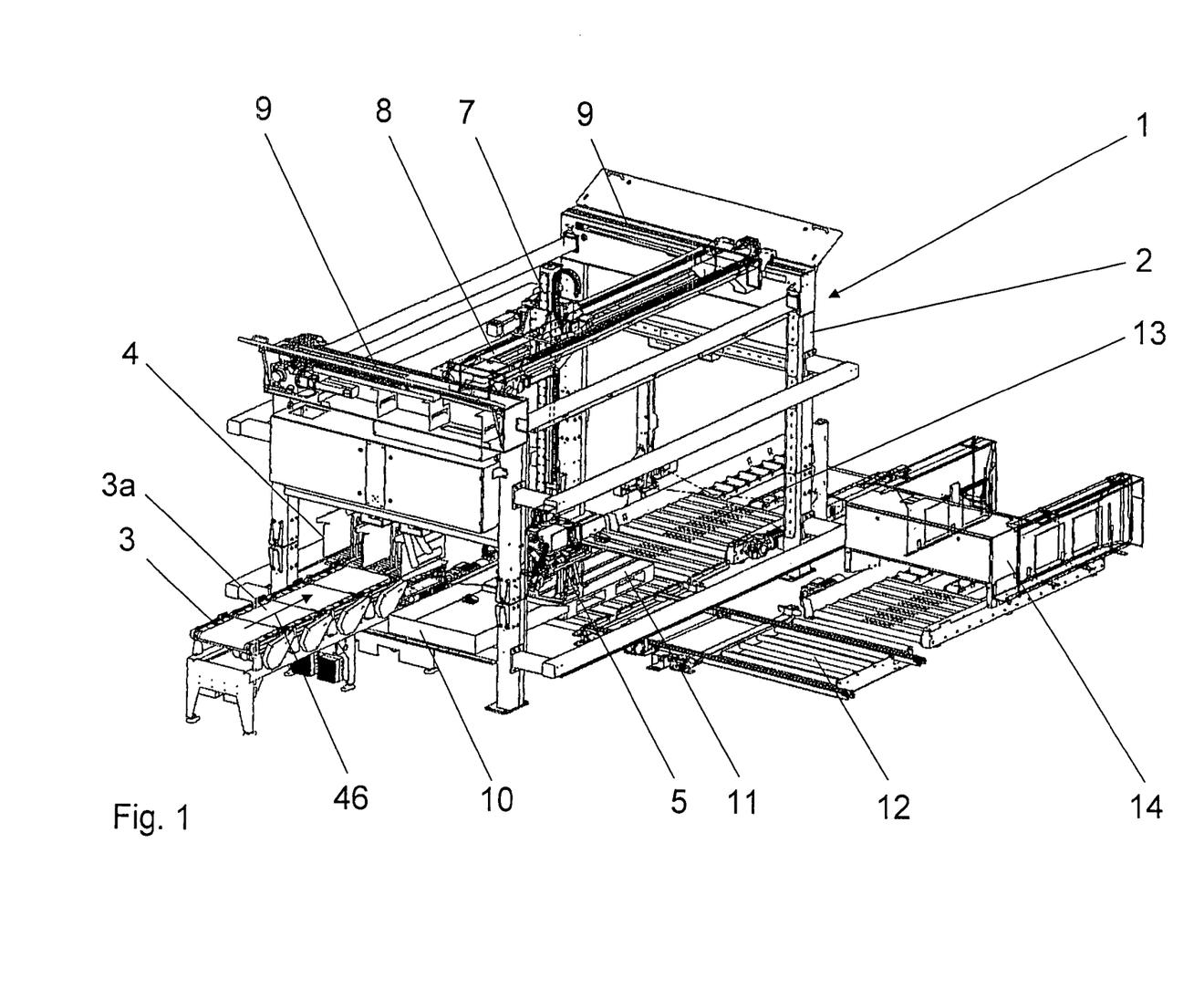
FIG. 1 is a schematic perspective view of a stack palletizing system with an infeed station of the invention.
Figure 10:
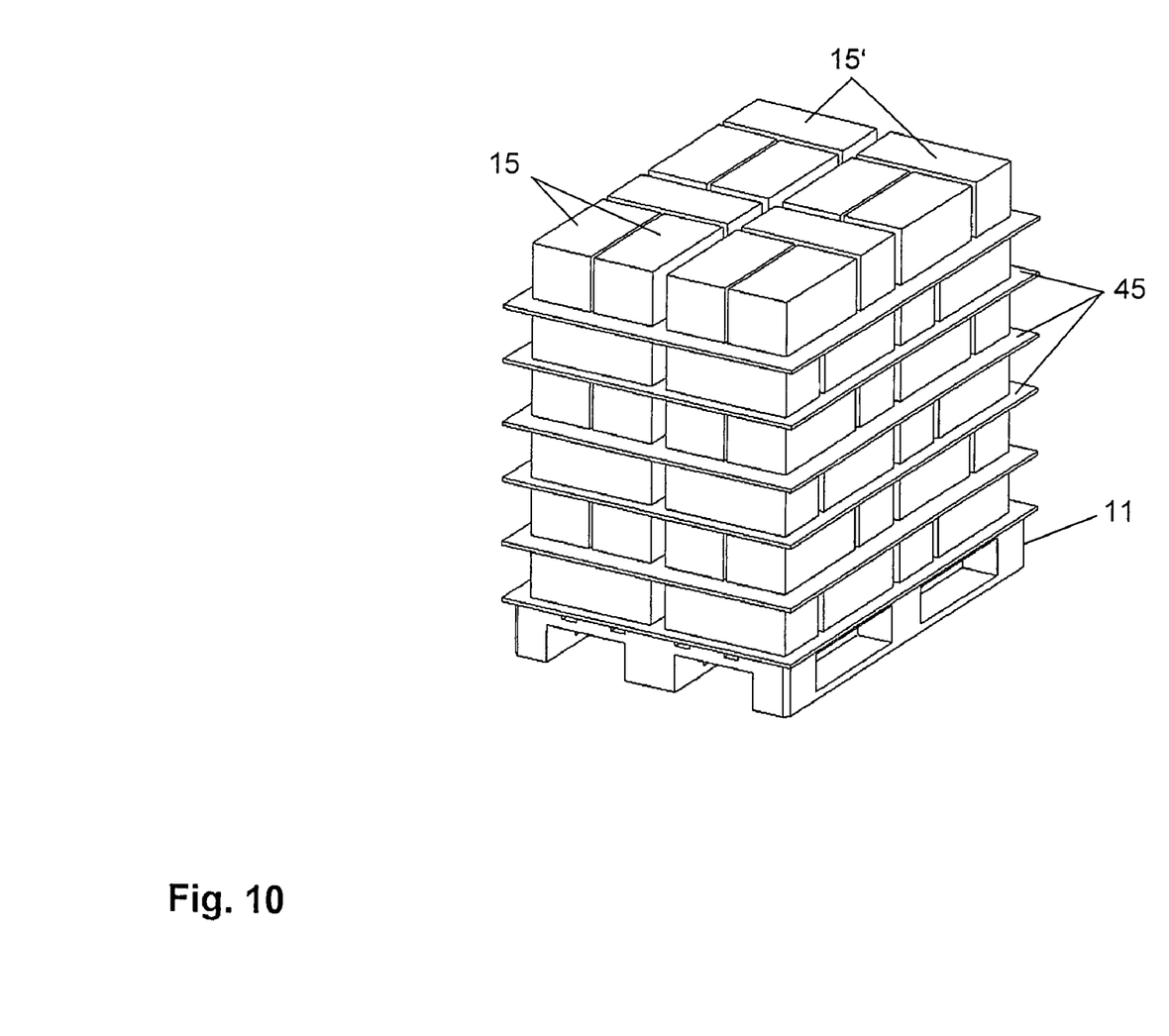
FIG. 10 is a perspective view of a pallet with palletized stacks.

Stacks 15 and 15' can be palletized on a pallet 11, as shown in FIG. 10, with the palletizing system 1 shown in FIG. 1. Cardboard separators 45 are arranged between the stacks 15 and 15'. The palletization itself is performed automatically and is controlled in such a way that the stacks 15 and 15' are set down on the pallet 11 optimally and exactly. The cardboard separators 45 are also set down automatically. The stacks 15 and 15' are any type of stacked products, preferably printed products, such as signatures, newspapers, books and the like. The stacks 15 and 15' can be wrapped in sheets or bound in any other way, but this is not necessary. The stacks 15 and 15' can also consist of individual printed products, for example, thick catalogues.

The palletizing system 1 consists of a machine frame 2, in front of which a stack feeder 3 is arranged, as shown in FIG. 1. The stack feeder 3 serves to feed the stacks 15 and 15' to a stack infeed station 4, which is installed inside the frame 2. The stacks 15 and 15' are conveyed one after another in a row, and for this purpose the stack feeder 3 is provided, for example, with a conveyor belt 3a. In FIG. 1, the arrow 46 shows the direction in which the stacks 15 and 15' are fed to the stack infeed station 4. The stack feeder 3 can be designed in basically any desired way.

Figure 9:
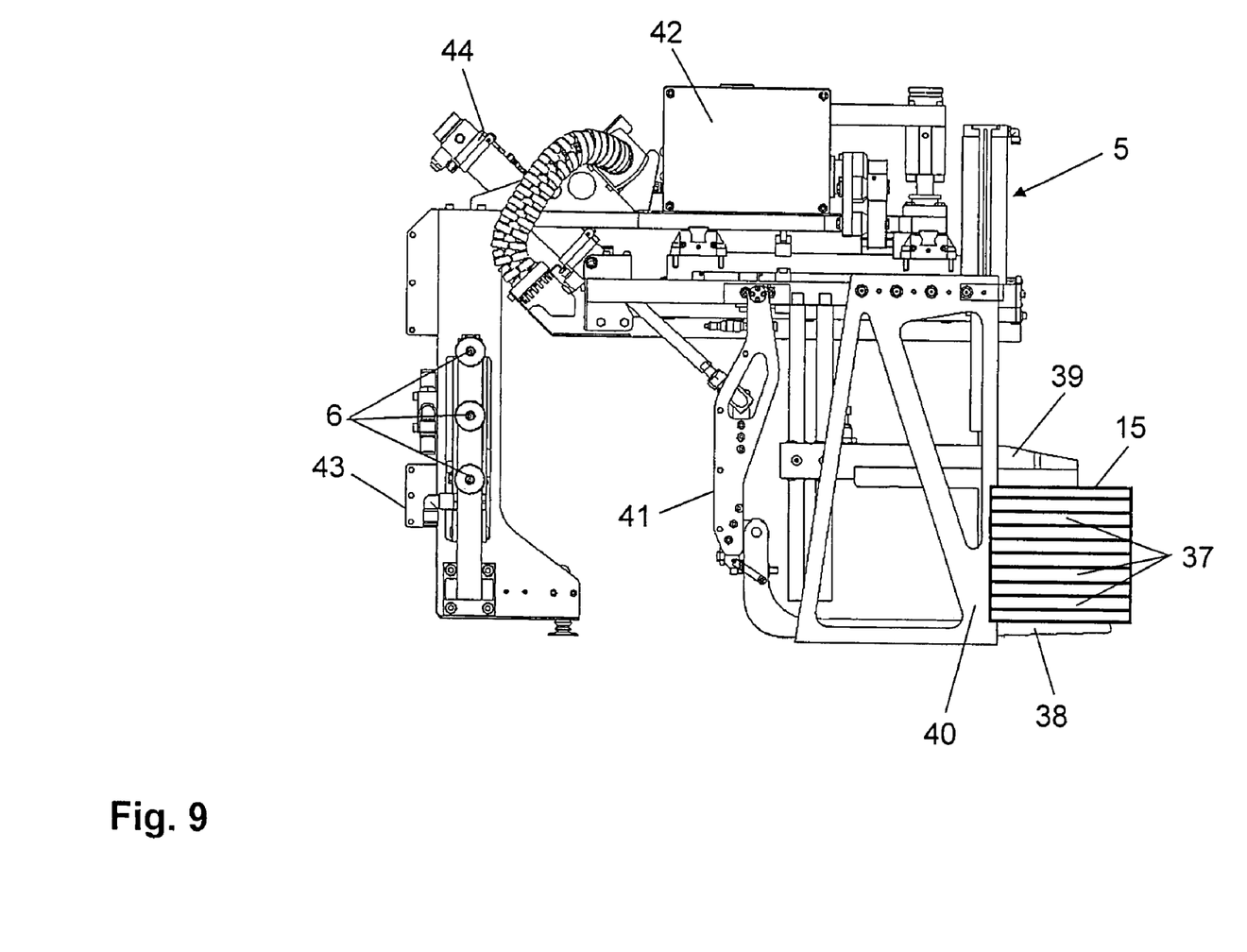
FIG. 9 is a side view of a stack gripper.

The palletizing system 1 also has a stack gripper 5, which is shown in detail in FIG. 9. The stack gripper 5 removes stacks 15 from the stack infeed station 4 and sets them down on the pallet 11. To grip at least one stack 15, the stack gripper 5 has a finger 38 and a ram 39 as well as a stop element 40, on which the stack 15 can be positioned. The finger 38 is mounted on an arm 41, which can be moved by means of an actuating cylinder 44. The stack 15 consists here of a plurality of printed products 37. In addition, the stack gripper 5 has a cardboard separator gripper 43 with suction devices 6. The cardboard separator gripper 43 removes cardboard separators 45 from a cardboard separator magazine 10 and sets them down on the pallet 11. To control the individual movements, the stack gripper 5 has a suitable control unit 42. The stack gripper 5 can be moved in all directions in space and along a vertical upright 7. The upright 7 is supported on a bridge 8, which can be moved on two horizontal crossbeams 9 spaced some distance apart (FIG. 1).

Finally, the palletizing system 1 has a pallet dispenser 12 and a pallet magazine 14. By means which in themselves are already well known, the pallets 11 can be removed from the pallet magazine 14 one at a time and dispensed for palletization of the product. After the stacks 15 and 15' have been palletized on the pallets 11, the pallets can be moved out by a runout conveyor 13 and, for example, loaded onto a vehicle. The pallet 11 can also be loaded only with stacks 15 or only with stacks 15'.

Figure 2:
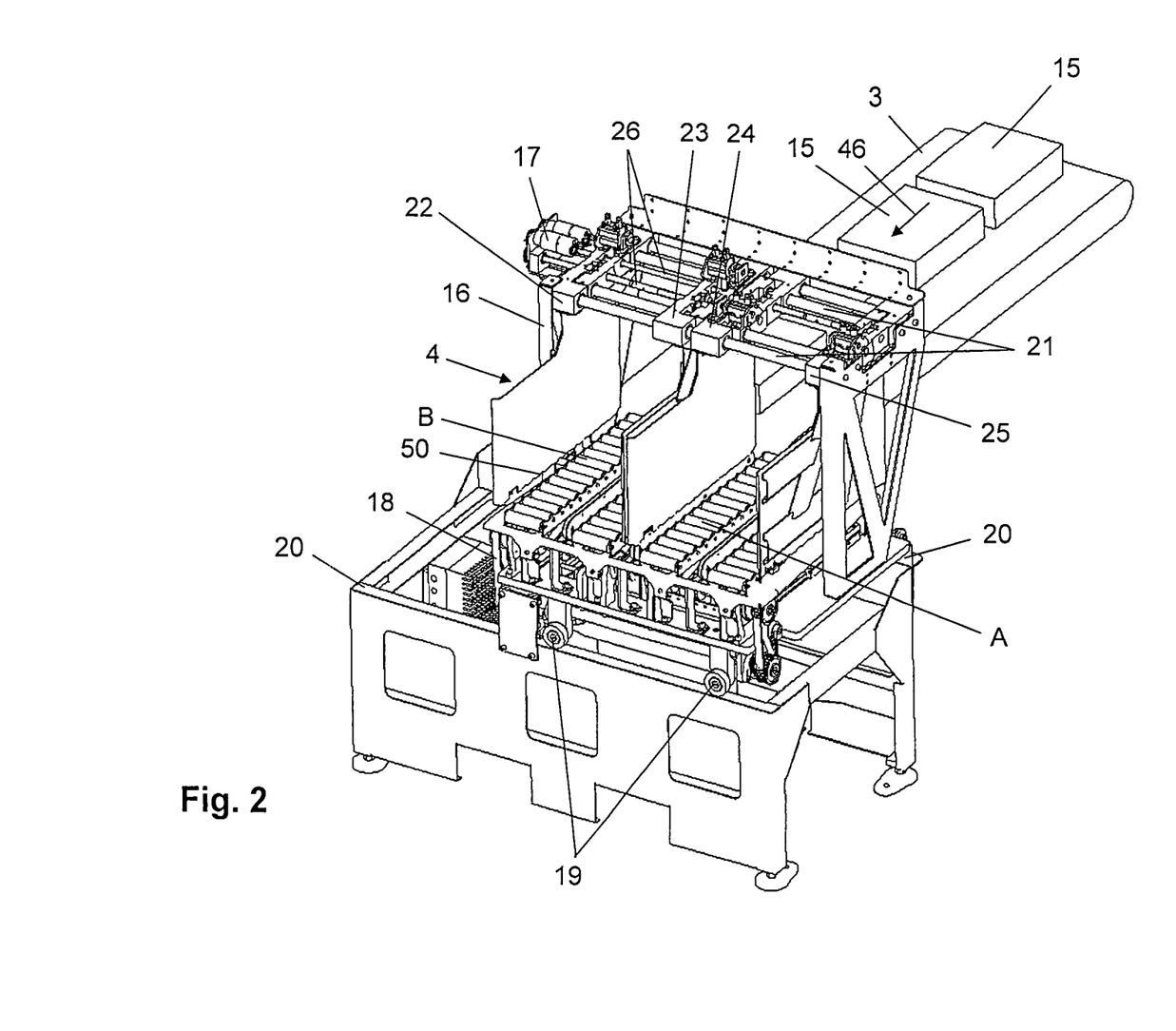
FIG. 2 is a perspective view of the infeed station.
Figure 3:
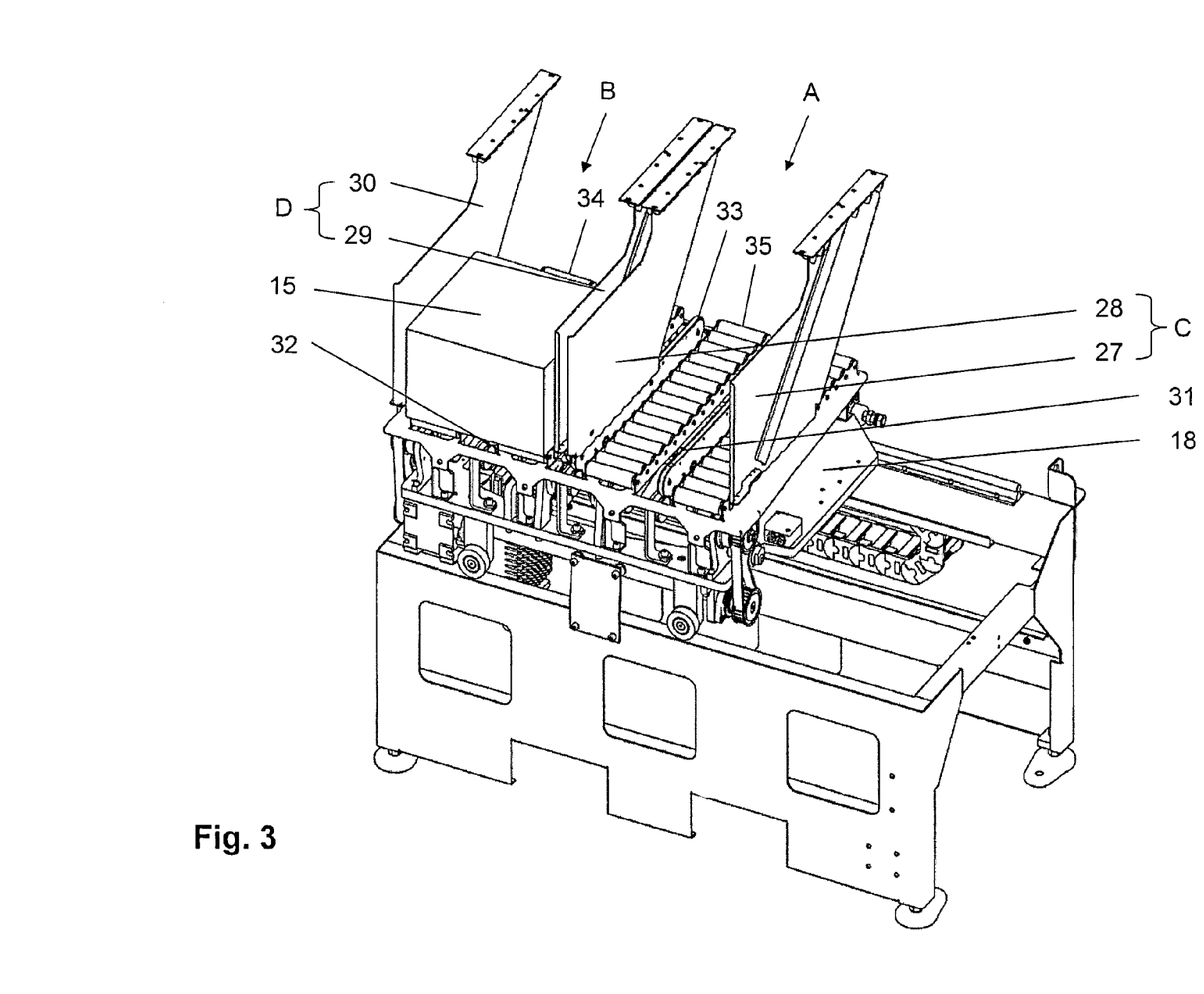
FIG. 3 is another perspective view of the infeed station of the invention.

As shown in FIG. 2, the stack infeed station 4 has a table 18, which is mounted by means of rollers 19 on two parallel tracks 20. As shown in FIG. 3, first conveying means 31, second conveying means 32, and third conveying means 33 are installed on the table 18. These conveying means 31-33 are, for example, endless conveyors, with, for example, a belt or a chain with drivers. The conveying means 31-33 can also each have more than one conveying member, for example, two or more than two endless belt conveyors or chain conveyors.

The table 18 and thus the stack infeed station 4 are arranged in such a way that they can be moved transversely to the direction of conveyance of the conveying means 31-33. The table 18 is moved under automatic control by means of a drive (not shown). In this regard, the table 18 can be shifted in such a way that the stacks 15 can be optionally fed to a first chamber A or a second chamber B of the stack infeed station 4. In FIG. 2, the table 18 is positioned in such a way that the stacks 15 are fed to the second chamber B. If the table 18 in FIG. 2 is shifted to the left, a position can be reached in which the stacks 15 are fed to the first chamber A.

In addition, rollers 34 and 35 are arranged on the table 18 as supports. These rollers extend transversely to the direction of conveyance and allow very slip-free conveyance of the stacks 15 and 15'. In FIG. 3, a stack 15 is present in the chamber B. As the drawing shows, the stack 15 is supported on the rollers 34. The second conveying means 32 is in contact with the stack 15 and is thus able to convey it. A stack 15 that is the same or similar can be similarly conveyed in the chamber A. To assist the conveyance of the stacks, the rollers 34 and 35 can also be designed to be driven.

The first chamber A is laterally bounded by first centering means C, which comprise a first centering member 27 and a second centering member 28. The second chamber B is laterally bounded by second centering means D, which comprise a third centering member 29 and a fourth centering member 30. These centering members 27-30 extend vertically and parallel to one another. They are designed, for example, as plates. The centering members 27-30 are each displaceably supported at an upper end with beams 22-25 on guide rods or other suitable guide means. These guide rods 21 are mounted on a supporting frame 16, which is mounted on the table 18 and extends upward. The purpose of the centering members 27-30 is to center the stacks 15 and 15' during their conveyance in chambers A and B. To this end, the centering members 27-30 can be shifted relative to one other and transversely to the direction of conveyance. The shifting is preferably carried out automatically with a drive 17 and spindles 26, which engage the beams 22-25. Preferably, the centering members 27-30 can be shifted independently of one another. The shifting is carried out by a suitable control unit. The centering members 27-30 extend downward as far as the rollers 34 and 35. They preferably have profiling 50 on their lower edges, which is designed to correspond to the rollers 34 and 35 in such a way that the centering members 27-30 can be moved over the rollers 34 and 35 with as little clearance as possible. This makes it possible to ensure that the stacks 15 and 15' cannot get stuck between a centering member 27-30 and the rollers 34 and 35.

The centering members 27-30 can be adjusted in such a way that stacks 15 and 15' can be transferred to the stack gripper 5 in a double infeed mode or in a single infeed mode. This is explained in greater detail below with reference to FIGS. 4 to 8.

Figure 4:
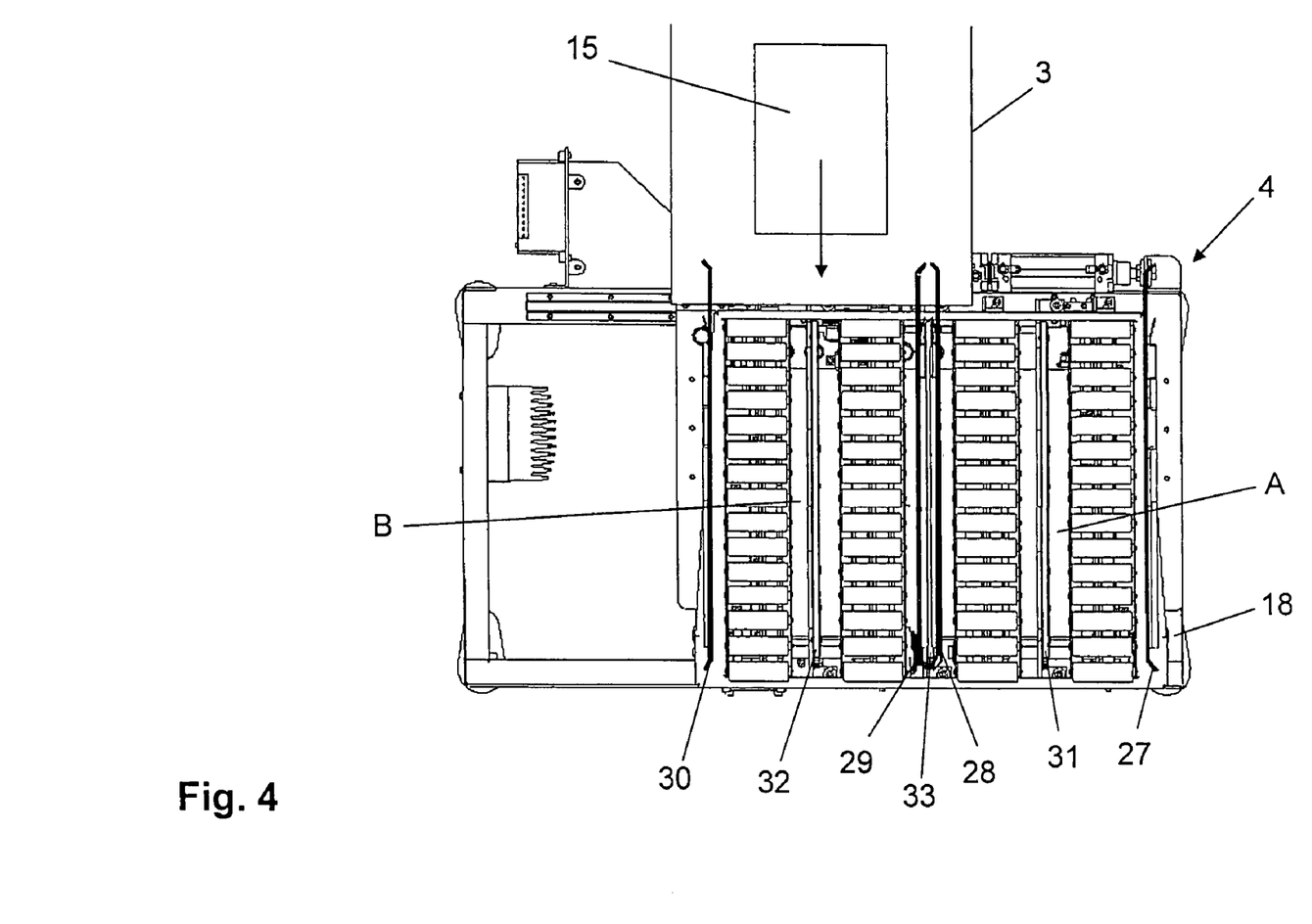
FIGS. 4 to 7 are top views of the infeed station of the invention, showing the infeed station in different phases of the changeover to a single infeed.

In the arrangement according to FIG. 4, the stack infeed station 4 is set up for double infeed. The two chambers A and B have essentially the same design. The table 18 is positioned in such a way that one stack 15 at a time can be fed by the stack feeder 3 to chamber B. If a stack 15 is located in chamber B, the table 18 in FIG. 4 is shifted to the left, so that another stack 15 can be fed to the first chamber A. The two stacks 15 can be conveyed with the first conveying means 31 and the second conveying means 32 and delivered to the stack gripper 5.

Figure 5:
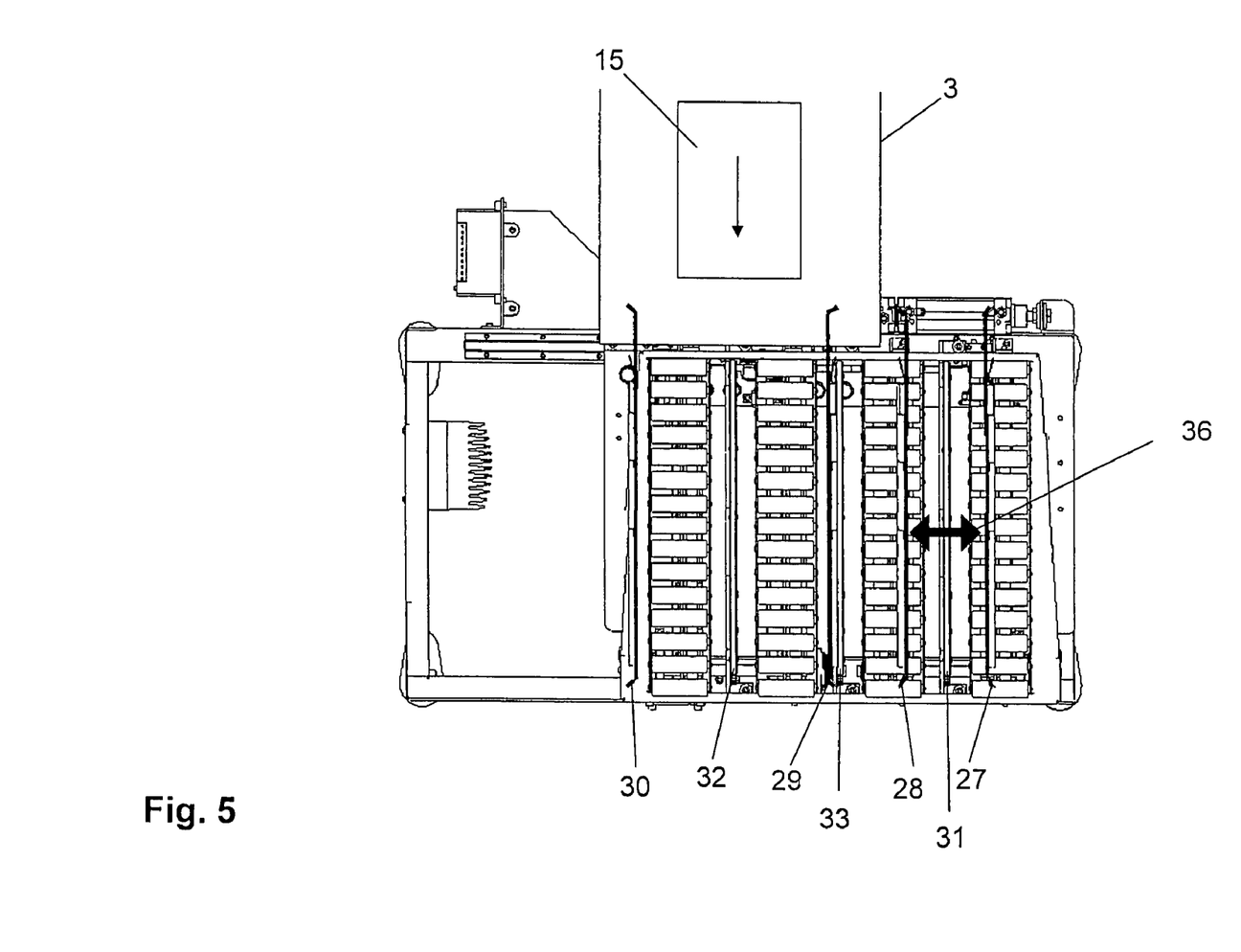
Figure 6:
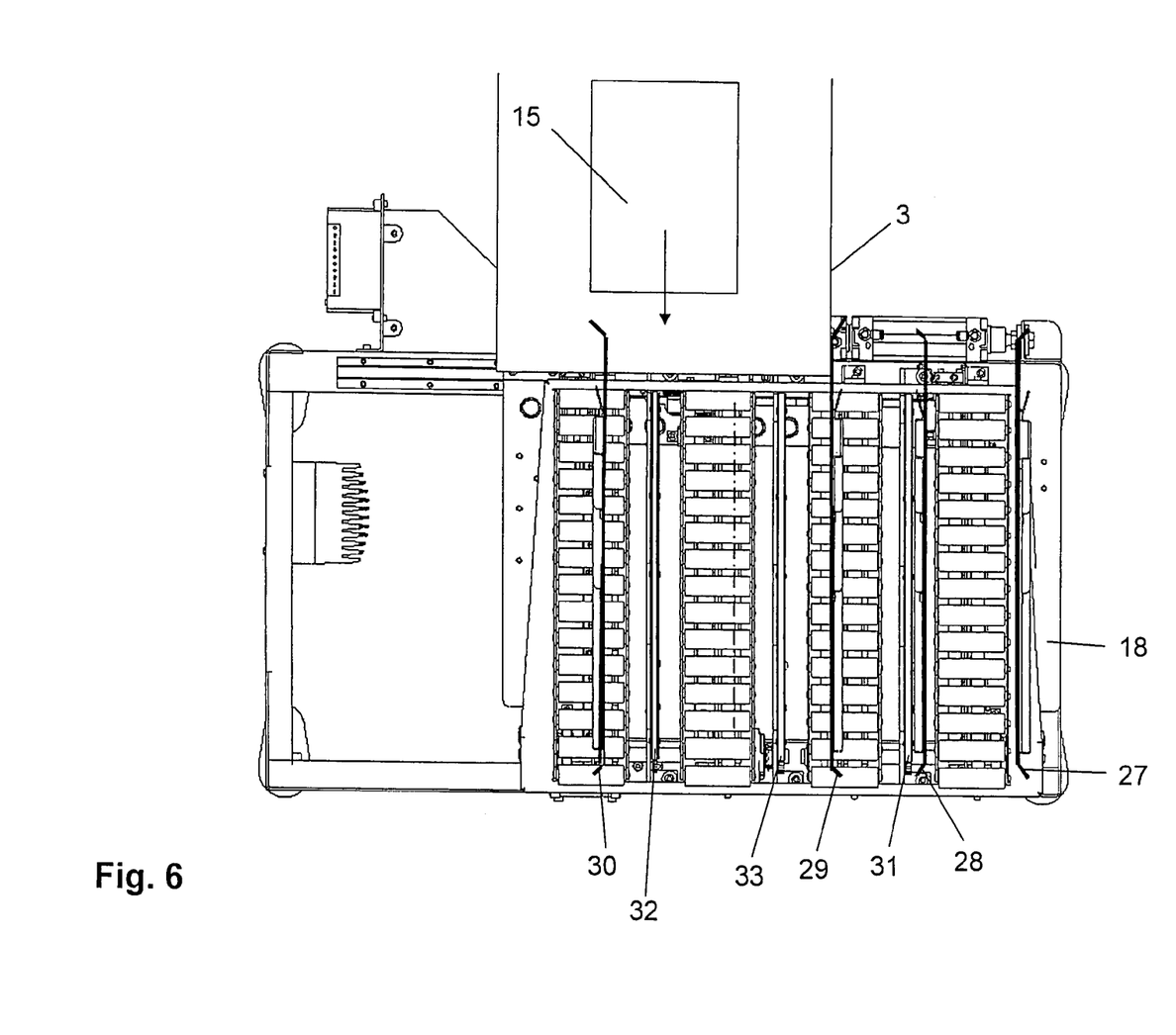
Figure 7:
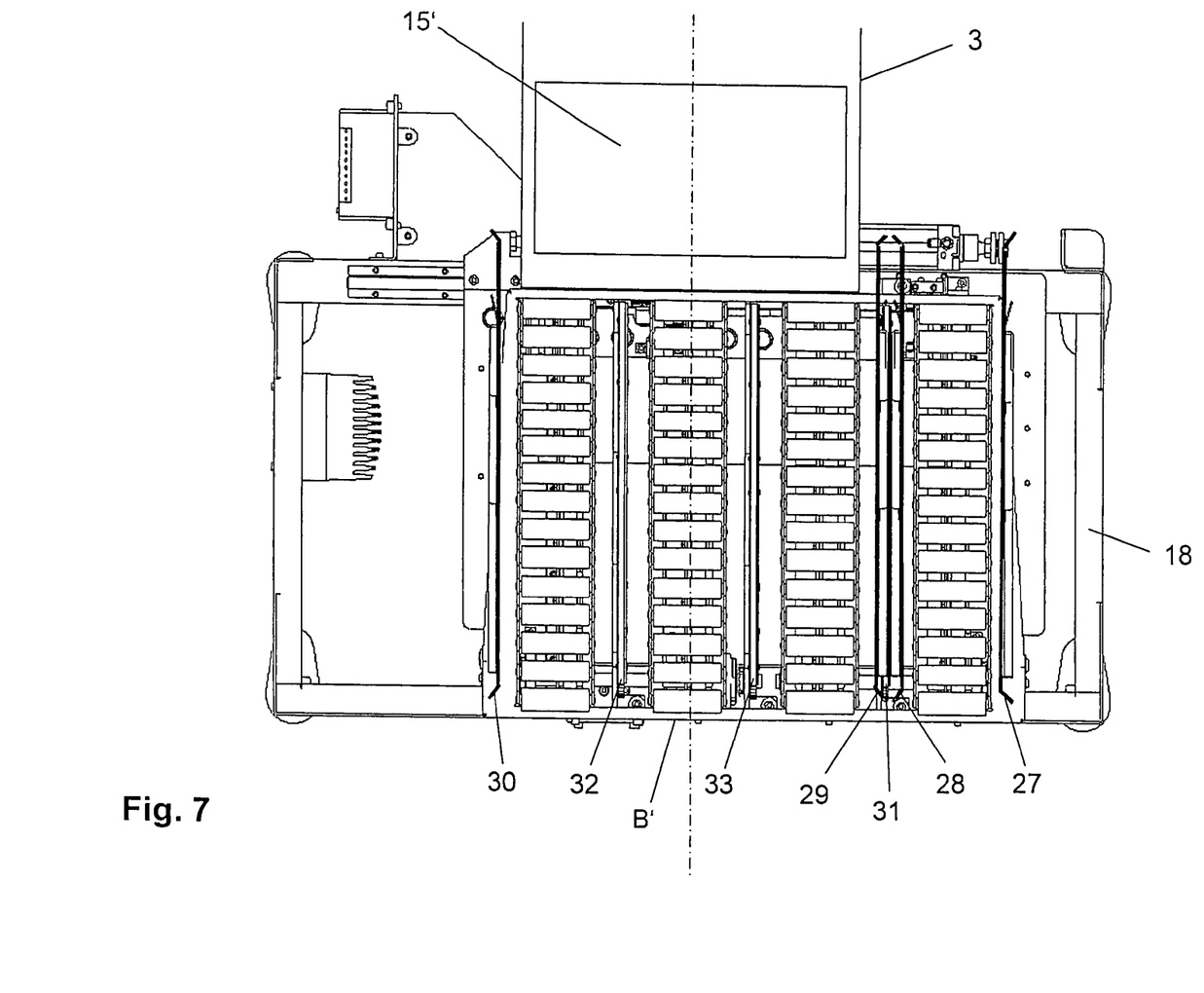

FIGS. 5 to 7 show the changeover of the stack infeed station 4 for single infeed. The individual steps can be carried out under automatic control.

Figure 8:
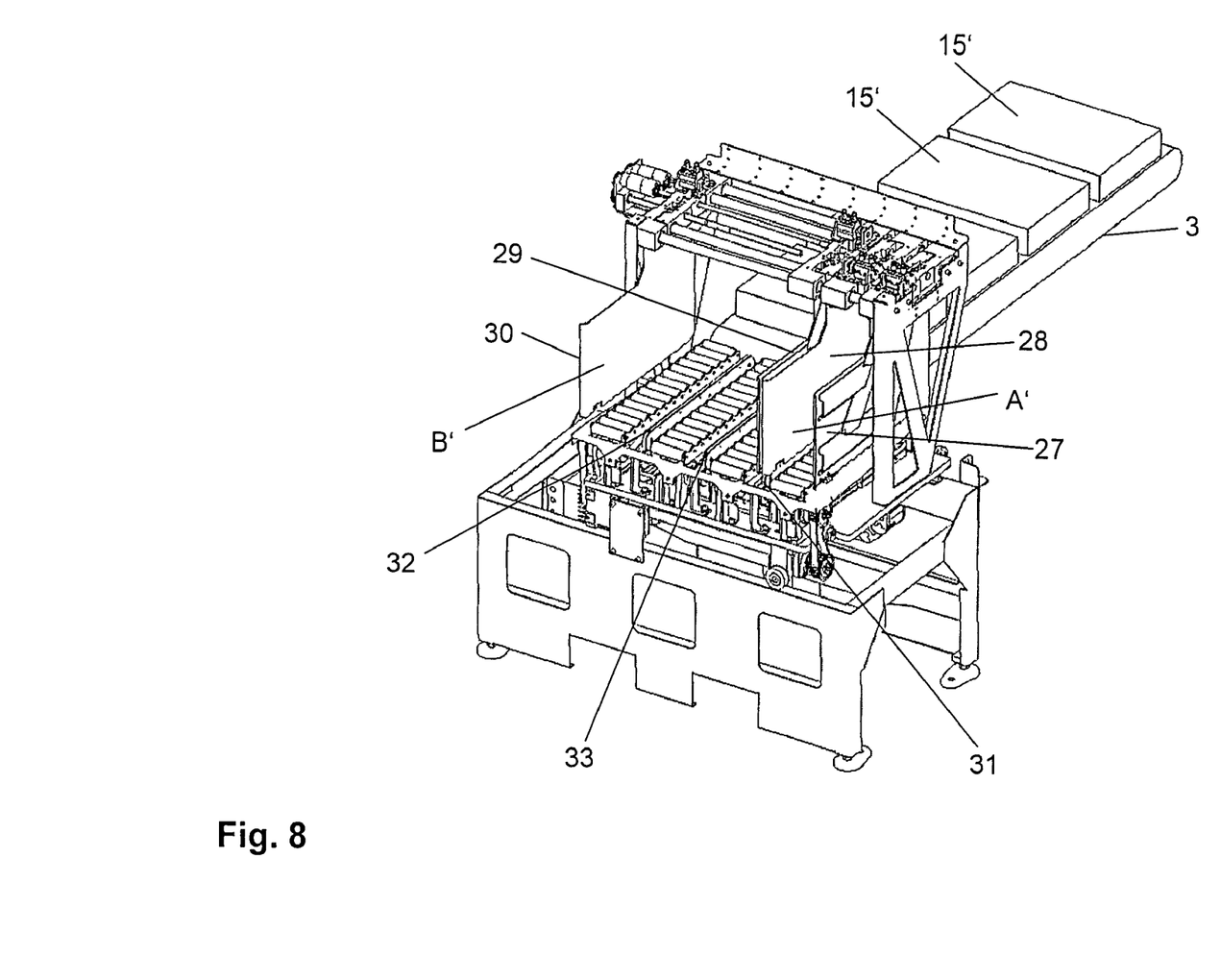
FIG. 8 is a perspective view of the infeed station of the invention, which is set for a single infeed.

First, the two centering members 27 and 28 are shifted into the position shown in FIG. 5. These shifts are indicated by the double arrow 36. The distance between the first centering member 27 and the second centering member 28 is reduced by this shift. The third centering member 29 and the fourth centering member 30 in FIG. 5 are then shifted to the right into the positions shown in FIG. 6. The third centering member 29 is thus located some distance from the third conveying means 33, as shown in FIG. 6. In a further step, the distance between the third centering member 29 and the fourth centering member 30 is further increased by suitable shifting of these two members into the positions shown in FIG. 7. Finally, the table 18 is moved into the position shown in FIG. 7, which results in the formation of a relatively wide, second chamber B', which is centered with respect to the stack feeder 3, as shown in the drawing. The two conveying means 32 and 33 are located within the chamber B'. A relatively wide stack 15' can be conveyed in the chamber B'. In this regard, the stack 15' is simultaneously conveyed by the second conveying means 32 and the third conveying means 33 and is laterally guided by the third centering member 29 and the fourth centering member 30. The stack 15' can be essentially about twice as wide as a stack 15. The stack 15' alone is seized by the stack gripper 5 and set down on the pallet 11. Naturally, a plurality of stacks 15' can be successively conveyed in the chamber B' and delivered to the stack gripper 5. During this process, the first conveying means 31 are preferably inactive, and the relatively narrow, first chamber A' is not used (FIG. 8).

If a double infeed is necessary, the centering members 27-30 are brought back to the positions shown in FIG. 4 by making suitable shifts. This changeover can also be automatically controlled.

While specific embodiments of the invention have been shown and described in detail to illustrate the inventive principles, it will be understood that the invention may be embodied otherwise without departing from such principles.

We claim:

1. An infeed station of a palletizing system, the infeed station comprising:
   a stack feeder,
   a first and second chamber, which can each receive stacks from the stack feeder,
   first conveying means assigned to the first chamber and second conveying means assigned to the second chamber, for conveying the stacks in the chambers and for transferring the stacks to a stack gripper, and
   first centering means for centering the stacks in the first chamber and second centering means for centering the stacks in the second chamber, and third conveying means arranged between the first and second conveying means, wherein the first and second centering means are shiftable relative to each other in such a way that the third conveying means are positioned in the first or second chamber, and the chamber with the third conveying means is much wider than the other, narrower chamber, wherein the conveying means in the narrower chamber is inactive when the wider chamber is in use.

2. The infeed station in accordance with claim 1, wherein the first and second centering means have two centering members each, which are spaced some distance apart and are supported at an upper end or at a lower end such that they can be shifted transversely to the direction of conveyance of the conveying means.

3. The infeed station in accordance with claim 2, wherein the two chambers and the conveying means and centering means are installed on a table that can be moved transversely to the direction of conveyance.

4. The infeed station in accordance with claim 1, wherein the first and second centering means can be adjusted independently of one another.

5. The infeed station in accordance with claim 4, wherein the centering means are each supported at an upper end in such a way that they can be displaced on horizontal guide rods.

6. The infeed station in accordance with claim 1, wherein the stacks are conveyed in the chambers on rollers.

7. The infeed station in accordance with claim 6, wherein the lower end of each of the centering means has a contour that is adapted to the rollers.

8. A method for transferring stacks to a stack gripper with an infeed station having
   a stack feeder,
   a first and second chamber, which can each receive stacks from the stack feeder,
   first conveying means assigned to the first chamber and second conveying means assigned to the second chamber, for conveying the stacks in the chambers and for transferring the stacks to a stack gripper, and
   first centering means for centering the stacks in the first chamber and second centering means for centering the stacks in the second chamber, and third conveying means arranged between the first and second conveying means, wherein the first and second centering means are shiftable relative to each other in such a way that the third conveying means are positioned in the first or second chamber, and the chamber with the third conveying means is much wider than the other, narrower chamber, the method comprising: adjusting the centering means in such a way that depending on the format of the stacks that are to be transferred to the stack gripper, for double infeed, stacks are conveyed in both chambers, or for single infeed, stacks are conveyed in one of the two chambers; subsequently transferring the stacks to the stack gripper; and deactivating the conveying means in the narrower chamber when the wider chamber is being used.

9. The method in accordance with claim 8, wherein the stacks are conveyed in the chambers on rollers.

10. The method in accordance with claim 8, wherein, in the case of single infeed, the stacks are conveyed in the given chamber by at least two conveying means that are arranged at a distance from each other.

* * * * *